United States Patent
Sato

(10) Patent No.: US 11,738,804 B2
(45) Date of Patent: Aug. 29, 2023

(54) TRAINING A VEHICLE TO ACCOMMODATE A DRIVER

(71) Applicant: Micron Technology, Inc., Boise, ID (US)

(72) Inventor: Junichi Sato, Yokohama (JP)

(73) Assignee: Micron Technology, Inc., Boise, ID (US)

( * ) Notice: Subject to any disclaimer, the term of this patent is extended or adjusted under 35 U.S.C. 154(b) by 223 days.

(21) Appl. No.: 16/785,341

(22) Filed: Feb. 7, 2020

(65) Prior Publication Data

US 2021/0245766 A1    Aug. 12, 2021

(51) Int. Cl.

| B62D 15/02 | (2006.01) |
|---|---|
| B60W 40/09 | (2012.01) |
| B60W 60/00 | (2020.01) |
| G06N 3/08 | (2023.01) |
| G07C 5/08 | (2006.01) |
| G06V 20/59 | (2022.01) |
| G06V 10/82 | (2022.01) |
| B60W 40/08 | (2012.01) |

(52) U.S. Cl.
CPC .......... B62D 15/025 (2013.01); B60W 40/09 (2013.01); B60W 60/0051 (2020.02); G06N 3/08 (2013.01); G06V 10/82 (2022.01); G06V 20/597 (2022.01); G07C 5/085 (2013.01); B60W 2040/0863 (2013.01); B60W 2540/30 (2013.01)

(58) Field of Classification Search
CPC ............. B60W 40/09; B60W 60/0051; B60W 2040/0863; B60W 2540/30; G06V 20/597; B62D 15/025; G06N 3/08; G07C 5/085
See application file for complete search history.

(56) References Cited

U.S. PATENT DOCUMENTS 10,471,963 B2 *  11/2019  Huang ................ B60W 50/082
10,745,019 B2 *   8/2020  Werner .................. G06N 5/022
(Continued)

FOREIGN PATENT DOCUMENTS

| KR | 20170133213 | 12/2017 |
|---|---|---|
| WO | 2018031759 | 2/2018 |

OTHER PUBLICATIONS

International Search Report and Written Opinion, PCT/US2021/016404, dated May 7, 2021.

*Primary Examiner* — Anne Marie Antonucci
*Assistant Examiner* — Patrick M Brady
(74) *Attorney, Agent, or Firm* — Greenberg Traurig

(57) ABSTRACT

A system can train a vehicle electronically to accommodate a driver. The system can train the vehicle to accommodate the ability, condition, and/or personality of the driver. The system can change the controls of the vehicle, responsive to the inputs from the driver, to match with the patterns of controls resulting from a predetermined model (such as a safe-driver model). Accordingly, the vehicle can appear as it is being driven by a safe driver when it may not be the case. A driver with a lower driving competence may apply physical controls in a pattern that may be slow, unstable, or insufficient. However, the vehicle can be trained to adjust the transformation from the UI signals to the drive-by-wire signals such that the transformed signals appear to be applied by a more competent driver on the road. And, the transformation can improve over time with training via machine learning.

20 Claims, 6 Drawing Sheets

(56) References Cited

U.S. PATENT DOCUMENTS

| | | |
|---|---|---|
| 2007/0192006 A1 | 8/2007 | Kimura et al. |
| 2009/0076682 A1 | 3/2009 | Ghoneim |
| 2013/0151046 A1 | 6/2013 | Choi et al. |
| 2016/0001781 A1* | 1/2016 | Fung ........................ G07C 9/37 |
| | | 701/36 |
| 2018/0281812 A1* | 10/2018 | Tochioka .............. B60W 40/09 |
| 2019/0113917 A1* | 4/2019 | Buch .................... G05D 1/0285 |
| 2019/0382003 A1* | 12/2019 | Jiang ..................... G08G 1/163 |
| 2020/0148214 A1* | 5/2020 | Tamagaki ............ G06V 20/597 |
| 2022/0348217 A1* | 11/2022 | Jeong ................... B60W 40/04 |

* cited by examiner

400

--- detecting, by a plurality of sensors in a vehicle, signals indicative of degrees of control exerted by a driver with a plurality of user interface (UI) elements in the vehicle
402

↓ measuring, by the plurality UI elements, the signals indicative of degrees of control exerted by the driver
404

↓ transmitting, by the plurality UI elements, the measured signals electronically to a plurality of electronic control units (ECUs) of the vehicle and an advanced driver assistance system of the vehicle
406

↓ generating, by the ECUs, control signals for driving the vehicle based on the measured signals received from the plurality of UI elements
408

↓ identifying, by the advanced driver assistance system, a pattern of the driver interacting with the plurality of UI elements based on the measured signals received from the plurality of UI elements
410

↓ determining, by the advanced driver assistance system, a deviation of the pattern from a predetermined model
412

↓ adjusting, by the advanced driver assistance system, the plurality of ECUs in converting the signals measured by the UI elements to the control signals for driving the vehicle according to the deviation
414

```
detecting, by a plurality of sensors in a vehicle, signals indicative of degrees of control exerted by a driver with
a plurality of user interface (UI) elements in the vehicle
402
```

```
measuring, by the plurality UI elements, the signals indicative of degrees of control exerted by the driver
404
```

```
transmitting, by the plurality UI elements, the measured signals electronically to a plurality of electronic control
units (ECUs) of the vehicle and an advanced driver assistance system of the vehicle
406
```

```
generating, by the ECUs, control signals for driving the vehicle based on the measured signals received from
the plurality of UI elements
408
```

```
identifying, by the advanced driver assistance system, a pattern of the driver interacting with the plurality of UI
elements based on the measured signals received from the plurality of UI elements
410
```

```
determining, by the advanced driver assistance system, a deviation of the pattern from a predetermined model
412
```

```
generating, by the advanced driver assistance system, a signal modulation for the driver based on the
determined deviation
502
```

```
adjusting, by the advanced driver assistance system, the plurality of ECUs in converting the signals measured
by the UI elements to the control signals for driving the vehicle according to the generated signal modulation
504
```

--- detecting, by a plurality of sensors in a vehicle, signals indicative of degrees of control exerted by a driver with a plurality of user interface (UI) elements in the vehicle
402

↓ measuring, by the plurality UI elements, the signals indicative of degrees of control exerted by the driver
404

↓ transmitting, by the plurality UI elements, the measured signals electronically to a plurality of electronic control units (ECUs) of the vehicle and an advanced driver assistance system of the vehicle
406

↓ generating, by the ECUs, control signals for driving the vehicle based on the measured signals received from the plurality of UI elements
408

↓ identifying, by the advanced driver assistance system, a pattern of the driver interacting with the plurality of UI elements based on the measured signals received from the plurality of UI elements
410

↓ determining, by the advanced driver assistance system, a deviation of the pattern from a predetermined model
412

↓ changing, by the advanced driver assistance system, a transfer function of the plurality of UI elements based on the determined deviation
602

↓ adjusting, by the advanced driver assistance system, the plurality of ECUs in converting the signals measured by the UI elements to the control signals for driving the vehicle according to the changed transfer function
604

FIG. 6

TRAINING A VEHICLE TO ACCOMMODATE A DRIVER

FIELD OF THE TECHNOLOGY

At least some embodiments disclosed herein relate to training a vehicle electronically to accommodate a driver.

BACKGROUND

An advanced driver assistance system (ADAS) is an electronic system that helps a driver of a vehicle while driving. An ADAS provides for increased car safety and road safety. An ADAS can use electronic technology, such as electronic control units and power semiconductor devices. Most road accidents occur due to human error; thus, an ADAS, which automates some control of the vehicle, can reduce human error and road accidents. Such systems have been designed to automate, adapt and enhance vehicle systems for safety and improved driving. Safety features of an ADAS are designed to avoid collisions and accidents by offering technologies that alert the driver to potential problems, or to avoid collisions by implementing safeguards and taking over control of the vehicle. Adaptive features may automate lighting, provide adaptive cruise control and collision avoidance, provide pedestrian crash avoidance mitigation (PCAM), alert driver to other cars or dangers, provide a lane departure warning system, provide automatic lane centering, show field of view in blind spots, or connect to navigation systems.

Besides cars and trucks, advanced driver assistance systems or analogous systems can be implemented in vehicles in general. And, such vehicles can include boats and airplanes, as well as vehicles or vehicular equipment for military, construction, farming, or recreational use. Vehicles can be customized or personalize via vehicle electronics and advanced driver assistance systems.

Vehicle electronics can include electronic systems used in vehicles. Vehicle electronics can include electronics for the drivetrain of a vehicle, the body or interior features of the vehicle, entertainment systems in the vehicle, and other parts of the vehicle. Ignition, engine, and transmission electronics can be found in vehicles with internal combustion powered machinery. Related elements for control of electrical vehicular systems are also found in hybrid and electric vehicles such as hybrid or electric automobiles. For example, electric cars can rely on power electronics for main propulsion motor control and managing the battery system.

For an ADAS and other types of vehicle systems, vehicle electronics can be distributed systems. And, distributed systems in vehicles can include a powertrain control module and powertrain electronics, a body control module and body electronics, interior electronics, and chassis electronics, safety and entertainment electronics, and electronics for passenger and driver comfort systems. Also, vehicle electronics can include electronics for vehicular automation. Such electronics can include or operate with mechatronics, artificial intelligence, and distributed systems. A vehicle using automation for complex tasks, including navigation, may be referred to as semi-autonomous. A vehicle relying solely on automation can be referred to as autonomous. Society of Automotive Engineers (SAE) has categorized autonomy in to six levels. Level 0 or no automation. Level 1 or driver assistance, wherein the vehicle can control either steering or speed autonomously in specific circumstances to assist the driver. Level 2 or partial automation, wherein the vehicle can control both steering and speed autonomously in specific circumstances to assist the driver. Level 3 or conditional automation, wherein the vehicle can control both steering and speed autonomously under normal environmental conditions, but requires driver oversight. Level 4 or high automation, wherein the vehicle can complete a travel autonomously under normal environmental conditions, not requiring driver oversight. And, level 5 or full autonomy, wherein the vehicle can complete a travel autonomously in any environmental conditions.

BRIEF DESCRIPTION OF THE DRAWINGS

The present disclosure will be understood more fully from the detailed description given below and from the accompanying drawings of various embodiments of the disclosure.

FIGS. 4 to 6 illustrate flow diagrams of example operations that can be performed by aspects of the networked system depicted in FIGS. 1 to 3, in accordance with some embodiments of the present disclosure.

DETAILED DESCRIPTION

Figure 1:
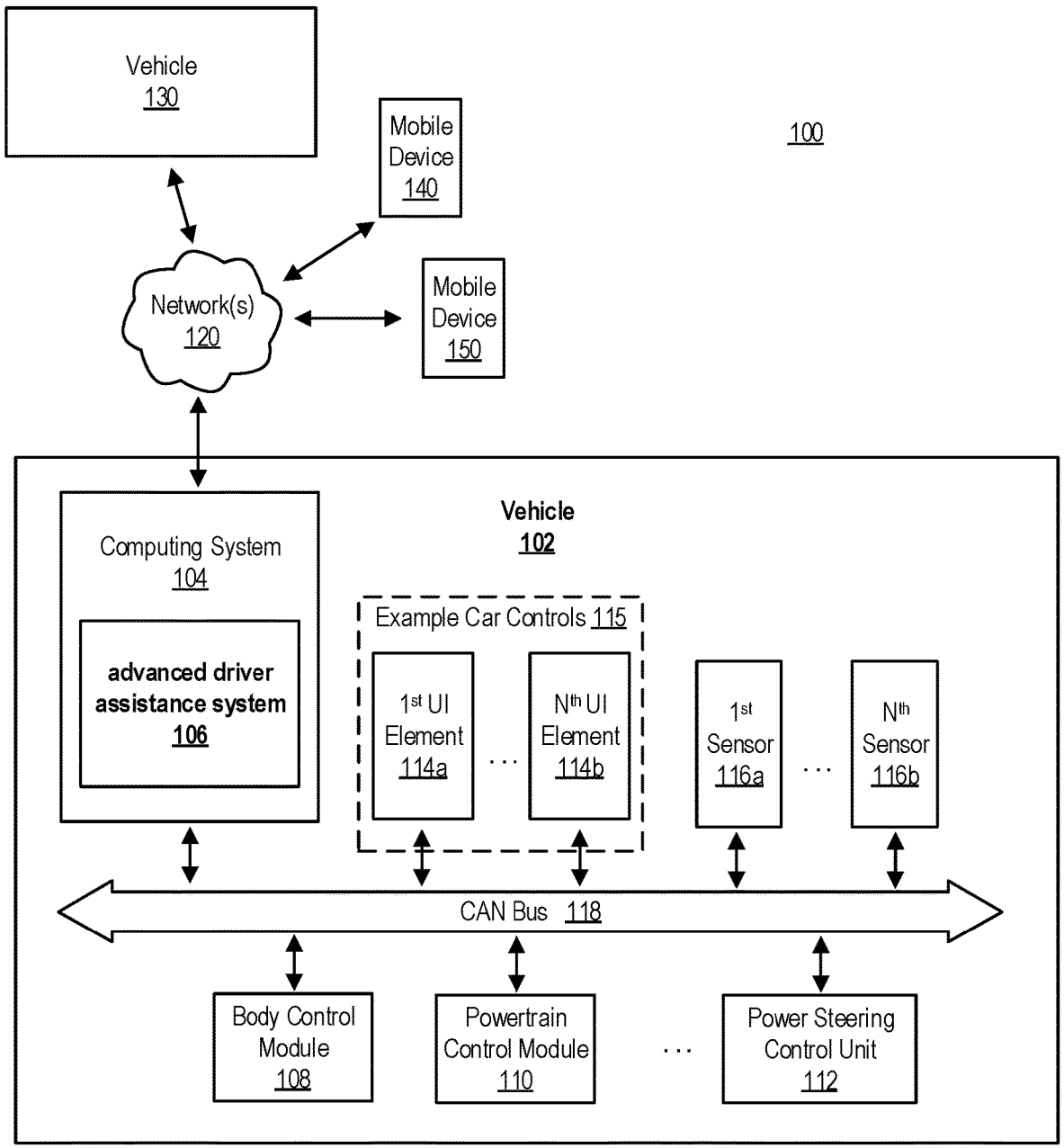
FIGS. 1 to 3 illustrate an example networked system that includes at least mobile devices and vehicles and that is configured to implement training a vehicle electronically to accommodate a driver, in accordance with some embodiments of the present disclosure.

At least some embodiments disclosed herein relate to training a vehicle electronically to accommodate a driver. For example, some example embodiments can relate to training a vehicle to accommodate the ability, condition, and/or personality of a driver. A vehicle system can change the implemented controls of the vehicle, responsive to inputs from the driver, to match with patterns of controls resulting from a predetermined model (such as a predetermined safe-driver model). Thus, the technologies described herein can provide for a vehicle to appear as it is being driven by a safe driver when it may not be the case. For example, a driver with a lower driving competence may apply physical controls in a pattern that may be slow, unstable, weak, or insufficient. However, the vehicle can be trained to adjust the transformation from the physical controls to the drive-by-wire controls such that the transformed controls appears to be applied by a typical or more competent driver on the road. For example, the transformation can be trained to match or simulate a capability level, a driving habit, and/or a driving style. And, the transformation can improve over time with training via machine learning.

In some embodiments, a driver can control driving of a vehicle via user input into a user interface (UI). In such embodiments, a system can receive the input from the driver or sense it, and then the system can control the vehicle accordingly. The transformation from the user input signal to the control signal for the physical mechanisms of driving the vehicle can occur via electronics of the vehicle and that transformation can be adjusted according to an ADAS. And, the transformation can be trained to match or simulate a capability level, a driving habit, and/or a driving style. And, the transformation can improve over time with training via machine learning.

In such embodiments and others, a UI can be, be a part of, or include a car control. For example, a UI can be a gas pedal, a brake pedal, or a steering wheel. Also, a UI can be a part of or include an electronic device and/or an electrical-mechanical device and can be a part of or include a tactile UI (touch), a visual UI (sight), an auditory UI (sound), an olfactory UI (smell), an equilibria UI (balance), or a gustatory UI (taste), or any combination thereof.

A set of mechanical components for controlling the driving of a vehicle can include: (1) a brake mechanism on the wheels (for stopping the spinning of the wheels), (2) a throttle mechanism on the engine or motor (for regulation of how much gas goes into the engine, or how much electrical current goes into the motor), which determines how fast the driving shaft can spin and thus how fast the car can run, and (3) a steering mechanism for the direction of the front wheels (for example, so the vehicle goes in the direction of where the wheels are pointing to). These mechanisms can control the braking, acceleration, and steering of the vehicle. The user indirectly controls these mechanism by UI elements that can be operated upon by the user, which are typically the brake pedal, the acceleration pedal, and the steering wheel. The pedals and the steering wheel are not mechanically connected to the driving mechanisms for braking, acceleration and steering. And, such parts can have or be proximate to sensors that measure how much the driver has pressed on the pedals and/or turned the steering wheel. Also, the sensed control input is transmitted to the control units over wires (and thus can be drive-by-wire).

Aspects for driving the vehicle that can be adjusted can include driving configurations and preferences adjustable from a controller via automotive electronics (such as adjustments in the transmission, engine, chassis, passenger environment, and safety features via respective automotive electronics). The driving aspects can also include typical driving aspects and/or drive-by-wire aspects, such as giving control to steering, braking, and acceleration of the vehicle. Aspects for driving a vehicle can also include controlling settings for different levels of automation according to the SAE, such as control to set no automation preferences/configurations (level 0), driver assistance preferences/configurations (level 1), partial automation preferences/configurations (level 2), conditional automation preferences/configurations (level 3), high automation preferences/configurations (level 4), or full preferences/configurations (level 5). Aspects for driving a vehicle can also include controlling settings for driving mode such as sports or performance mode, fuel economy mode, tow mode, all-electric mode, hybrid mode, AWD mode, FWD mode, RWD mode, and 4WD mode.

In a vehicle, a driver can control the vehicle via physical control elements (e.g., steering wheel, brake pedal, gas pedal, paddle gear shifter, etc.) that interface drive components via mechanical linkages and some electro-mechanical linkages. However, more and more vehicles currently have the control elements interface the mechanical powertrain elements (e.g., brake system, steering mechanisms, drive train, etc.) via electronic control elements or modules (e.g., electronic control units or ECUs). The electronic control elements or modules can be a part of drive-by-wire technology.

Drive-by-wire technology can include electrical or electro-mechanical systems for performing vehicle functions traditionally achieved by mechanical linkages. The technology can replace the traditional mechanical control systems with electronic control systems using electromechanical actuators and human-machine interfaces such as pedal and steering feel emulators. Components such as the steering column, intermediate shafts, pumps, hoses, belts, coolers and vacuum servos and master cylinders can be eliminated from the vehicle. There are varying degrees and types of drive-by-wire technology.

Vehicles having drive-by-wire technology can include a modulator (such as a modulator including or being a part of an ECU and/or an ADAS) that receives input from a user or driver (such as via more conventional controls or via drive-by-wire controls or some combination thereof). The modulator can then use the input of the driver to modulate the input or transform it to match input of a "safe driver". The input of a "safe driver" can be represented by a model of a "safe driver".

The modulator (such as a modulator including or being a part of an ECU and/or an ADAS) can be trained or adjusted such that the transformation from user input to "safe driver" input occurs at a higher success rate. With time, the modulator can become more effective at the transformation. Thus, with time, the vehicle having the trainable modulator, can be trained to more successfully accommodate the ability or personality of an "unsafe" driver. The modulator can use machine learning and AI. For example, the modulator can include an artificial neural network (ANN) and the ANN can be trained over time. Also, there are at least three components in training a vehicle to accommodate the ability or character or habits of a driver. The first component is parameterizing input characteristics of a driver. The second component is parameterizing output characteristics of a safe or competent driver. The third component is determining a modulation technique and/or algorithm that transforms the first component into the second component regularly or consistently (or to a certain extent). For example, the transformation has a certain success rate where a certain threshold is met. The training or adjustments of the modulation technique and/or algorithm can be based on the success rate or results of output compared to desired output. The desired output is output associated with a safe driver, etc. The input is input of any driver using the vehicle.

The "safe driver" model can be generated based on historically safe driving data retrieved from sensors and meters in vehicles driven by safe drivers, etc. The model can be universal or more specific to types of vehicles and even specific to makes and models of vehicles.

Figure 2:
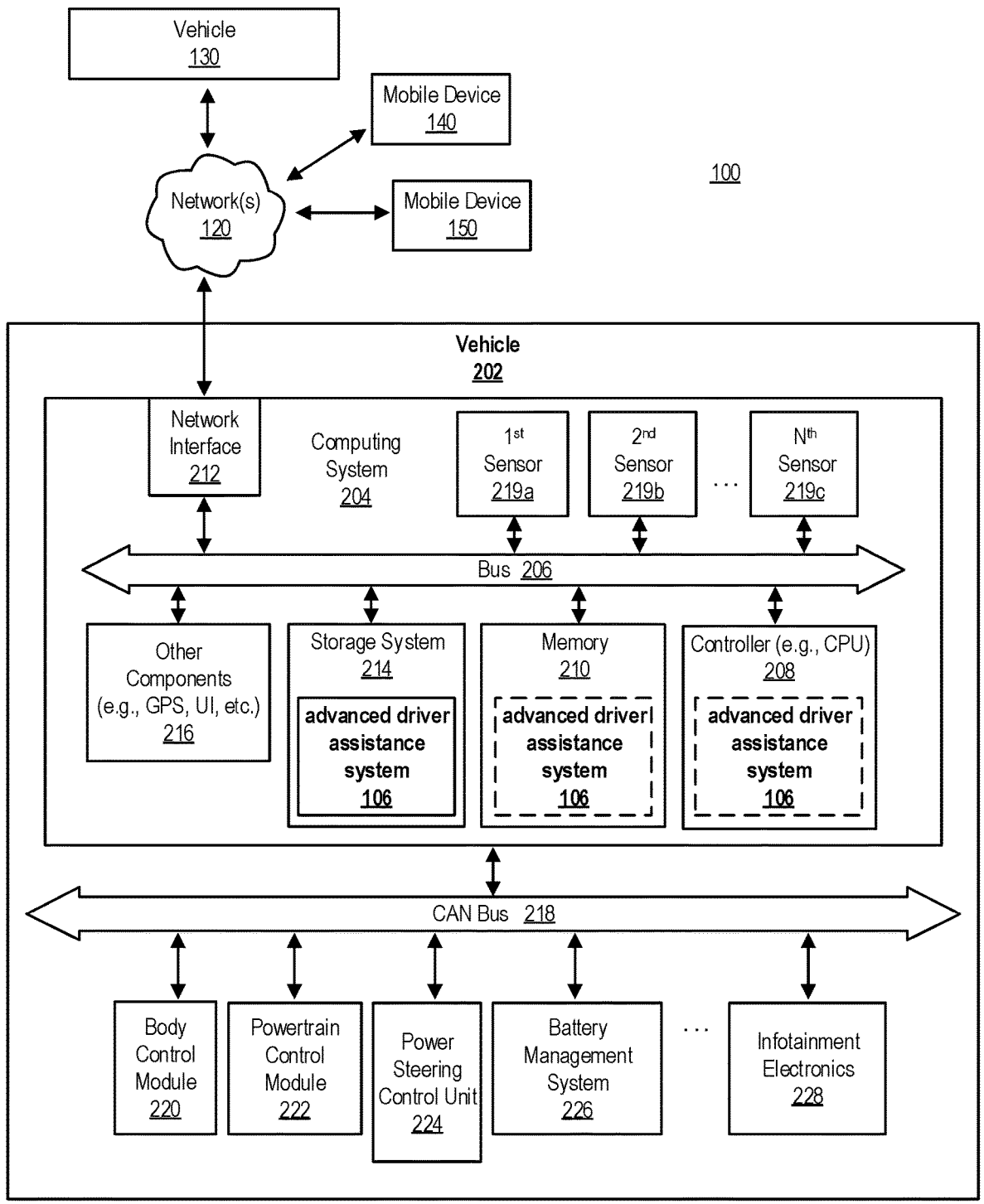
Figure 3:
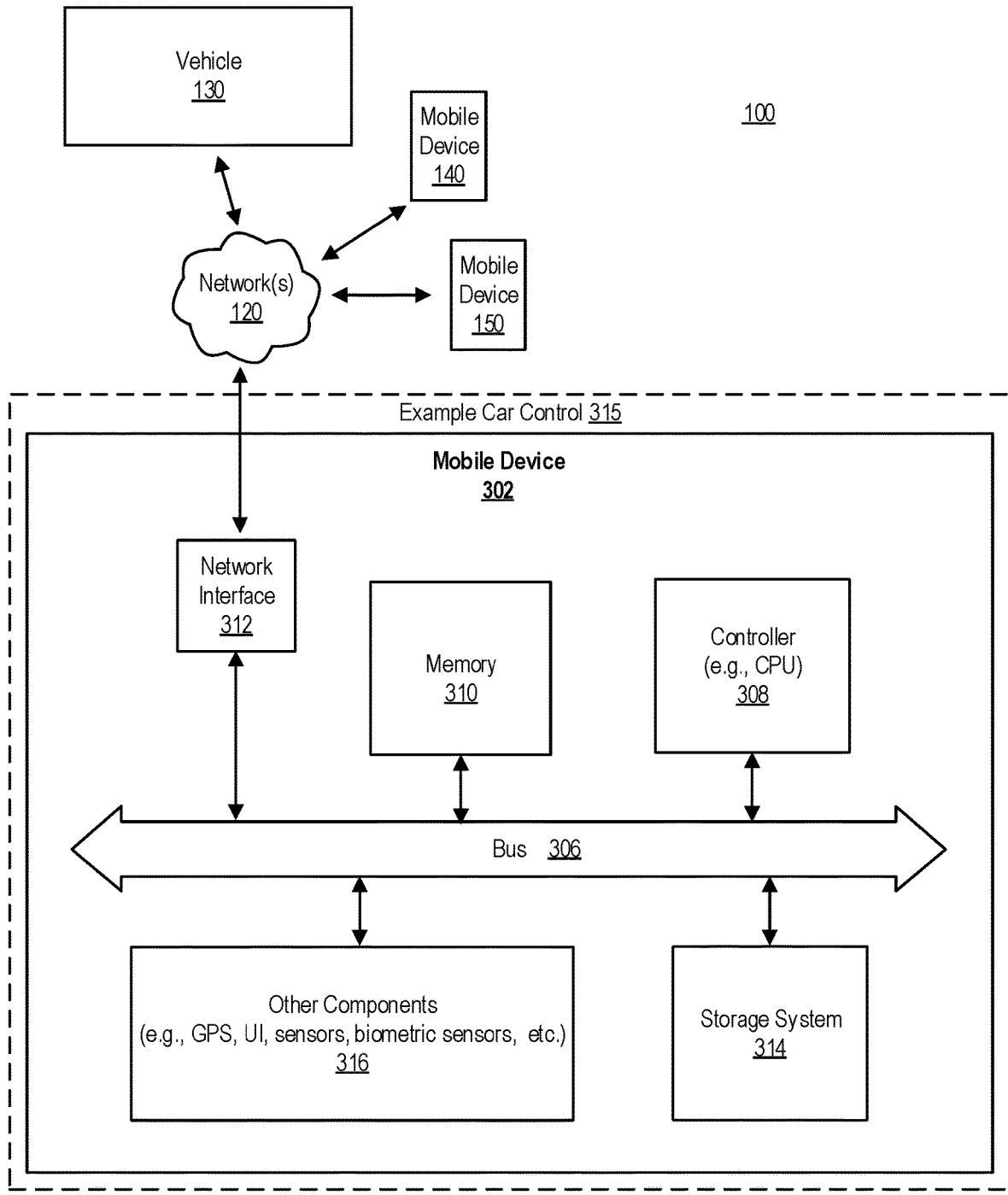

FIGS. 1 to 3 illustrate an example networked system 100 that includes at least mobile devices and vehicles (e.g., see mobile devices 140, 150, and 302 and vehicles 102, 202, and 130) and that is configured to implement training a vehicle electronically to accommodate a driver, in accordance with some embodiments of the present disclosure.

The networked system 100 is networked via one or more communications networks 120. Communication networks described herein, such as communications network(s) 120, can include at least a local to device network such as Bluetooth or the like, a wide area network (WAN), a local area network (LAN), the Intranet, a mobile wireless network such as 4G or 5G, an extranet, the Internet, and/or any combination thereof. Nodes of the networked system 100 (e.g., see mobile devices 140, 150, and 302 and vehicles 102, 202, and 130) can each be a part of a peer-to-peer network, a client-server network, a cloud computing environment, or the like. Also, any of the apparatuses, computing devices, vehicles, sensors or cameras, and/or user interfaces described herein can include a computer system of some sort (e.g., see computing systems 104 and 204). And, such a computer system can include a network interface to other devices in a LAN, an intranet, an extranet, and/or the Internet. The computer system can also operate in the capacity of a server or a client machine in client-server network environment, as a peer machine in a peer-to-peer (or distributed) network environment, or as a server or a client machine in a cloud computing infrastructure or environment.

As shown in FIG. 1, the networked system 100 can include at least a vehicle 102 that includes a vehicle computing system 104 (including an advance driver assistance system 106), a body and controllable parts of the body (not depicted), a powertrain and controllable parts of the powertrain (not depicted), a body control module 108 (which is a type of ECU), a powertrain control module 110 (which is a type of ECU), a power steering control unit 112 (which is a type of ECU). The vehicle 102 also includes a plurality of user interface elements (e.g., see UI elements 114a to 114b)—which are some of the example car controls 115 of the vehicle. And, the vehicle 102 includes a plurality of sensors (e.g., see sensors 116a to 116b) and a controller area network (CAN) bus 118 that connects at least the vehicle computing system 104, the body control module 108, the powertrain control module 110, the power steering control unit 112, the plurality of UI elements, and the plurality of sensors to each other. Also, as shown, the vehicle 102 is connected to the network(s) 120 via the vehicle computing system 104. Also, shown, vehicle 130 and mobile devices 140 and 150 are connected to the network(s) 120. And, thus, are communicatively coupled to the vehicle 102.

The vehicle 102 includes vehicle electronics, including at least electronics for the controllable parts of the body, the controllable parts of the powertrain, and the controllable parts of the power steering. The vehicle 102 includes the controllable parts of the body and such parts and subsystems being connected to the body control module 108. The body includes at least a frame to support the powertrain. A chassis of the vehicle can be attached to the frame of the vehicle. The body can also include an interior for at least one driver or passenger. The interior can include seats. The controllable parts of the body can also include one or more power doors and/or one or more power windows. The body can also include any other known parts of a vehicle body. And, the controllable parts of the body can also include a convertible top, sunroof, power seats, and/or any other type of controllable part of a body of a vehicle. The body control module 108 can control the controllable parts of the body.

Also, the vehicle 102 also includes the controllable parts of the powertrain. The controllable parts of the powertrain and its parts and subsystems are connected to the powertrain control module 110. The controllable parts of the powertrain can include at least an engine, transmission, drive shafts, suspension and steering systems, and powertrain electrical systems. The powertrain can also include any other known parts of a vehicle powertrain and the controllable parts of the powertrain can include any other known controllable parts of a powertrain. Also, power steering parts that are controllable can be controlled via the power steering control unit 112.

The plurality of UI elements (e.g., see UI elements 114a to 114b) of the vehicle 102 can include any type of UI. The UI elements can be, be a part of, or include a car control. For example, a UI can be a gas pedal, a brake pedal, or a steering wheel. Also, a UI can be a part of or include an electronic device and/or an electrical-mechanical device and can be a part of or include a tactile UI (touch), a visual UI (sight), an auditory UI (sound), an olfactory UI (smell), an equilibria UI (balance), or a gustatory UI (taste), or any combination thereof.

The plurality of sensors (e.g., see sensors 116a to 116b) of the vehicle 102 can include any type of sensor or camera configured to sense and/or record one or more features or characteristics of the plurality of UI elements or output thereof. A sensor of the vehicle 102 can also be configured to generate data corresponding to the one or more features or characteristics of the plurality of UI elements or output thereof according to the sensed and/or recorded feature(s) or characteristic(s). A sensor of the vehicle 102 can also be configured to output the generated data corresponding to the one or more features or characteristics. Any one of the plurality of sensors can also be configured to send, such as via the CAN bus 118, the generated data corresponding to the one or more features or characteristics to the computing system 104 or other electronic circuitry of the vehicle 102 (such as the body control module 108, the powertrain control module 110, and the power steering control unit 112).

A set of mechanical components for controlling the driving of a vehicle can include: (1) a brake mechanism on the wheels (for stopping the spinning of the wheels), (2) a throttle mechanism on the engine or motor (for regulation of how much gas goes into the engine, or how much electrical current goes into the motor), which determines how fast the driving shaft can spin and thus how fast the car can run, and (3) a steering mechanism for the direction of the front wheels (for example, so the vehicle goes in the direction of where the wheels are pointing to). These mechanisms can control the braking, acceleration, and steering of the vehicle. The user indirectly controls these mechanism by UI elements that can be operated upon by the user, which are typically the brake pedal, the acceleration pedal, and the steering wheel. The pedals and the steering wheel are not mechanically connected to the driving mechanisms for braking, acceleration and steering. And, such parts can have or be proximate to sensors that measure how much the driver has pressed on the pedals and/or turned the steering wheel. Also, the sensed control input is transmitted to the control units over wires (and thus can be drive-by-wire).

In some embodiments, the vehicle 102 can include a body, a powertrain, and a chassis. The vehicle 102 can also include a plurality of electronic control units (ECUs) configured to control driving of the vehicle (e.g., see body control module 108, powertrain control module 110, and power steering control unit 112). The vehicle 102 can also include a plurality of user UI elements configured to be manipulated by a driver to indicate degrees of control exerted by the driver (e.g., see UI elements 114a to 114b of example car controls 115).

The plurality of UI elements (e.g., UI elements 114a to 114b) can be configured to measure signals indicative of the degrees of control exerted by the driver. The plurality of UI elements can also be configured to transmit the signals electronically to the plurality of ECUs. The ECUs (e.g., see body control module 108, powertrain control module 110, and power steering control unit 112) can be configured to generate control signals for driving the vehicle 102 based on the measured signals received from the plurality of UI elements.

The vehicle 102 can also include an advanced driver assistance system (e.g., see advance driver assistance system 106). The advance driver assistance system 106 (the ADAS 106) can be configured to identify a pattern of the driver interacting with the UI elements (e.g., UI elements 114a to 114b of example car controls 115). The ADAS 106 can also be configured to determine a deviation of the pattern from a predetermined model (e.g., a predetermined regular-driver model, predetermined safe-driver model, etc.). The ADAS 106 can also be configured to adjust the plurality of ECUs (e.g., body control module 108, powertrain control module 110, and power steering control unit 112) in converting the signals measured by the UI elements to the control signals for driving the vehicle 102 according to the deviation. For example, the ADAS 106 can be configured to change a transfer function used by the ECUs to control driving of the vehicle based on the deviation.

In such embodiments and others, the ADAS 106 can be further configured to adjust the plurality of ECUs (e.g., body control module 108, powertrain control module 110, and power steering control unit 112) in converting the signals measured by the UI elements (e.g., UI elements 114*a* to 114*b*) to the control signals for driving the vehicle 102 according to sensor data indicative of environmental conditions of the vehicle. And, the ADAS 106 can be further configured to determine response differences between the measured signals generated by the plurality of UI elements and driving decisions generated autonomously by the ADAS 106 according to the predetermined model and the sensor data indicative of environmental conditions of the vehicle 102. Also, the ADAS 106 can be further configured to train an ANN to identify the deviation based on the response differences.

In such embodiments and others, for the determination of the deviation, the ADAS 106 can be configured to input the transmitted signals indicative of the degrees of control into an ANN. And, the ADAS 106 can be configured to determine at least one feature of the deviation based on output of the ANN. Also, to train the determination of the deviation, the ADAS 106 can be configured to train the ANN. To train the ANN, the ADAS 106 can be configured to adjust the ANN based on the deviation.

In such embodiments and others, the predetermined model can be derived from related models of preselected safe drivers. Also, the predetermined model can be derived from related models for drivers having a preselected driver competence level. The predetermined model can also be derived from related models for drivers having a preselected driving habit. The predetermined model can also be derived from related models for drivers having a preselected driving style. And, the predetermined model can also be derived from any combination thereof.

In such embodiments and others, the plurality of UI (e.g., UI elements 114*a* to 114*b* of the example car controls 115) can include a steering control (e.g., a steering wheel or a GUI or another type of UI equivalent such as a voice input UI for steering). Also, the plurality of UI can include a braking control (e.g., a brake pedal or a GUI or another type of UI equivalent such as a voice input UI for braking). The plurality of UI can also include a throttling control (e.g., a gas pedal or a GUI or another type of UI equivalent such as a voice input UI for accelerating the vehicle). And, the degrees of control exerted by the driver can include detected user interactions with at least one of the steering control, the braking control, or the throttling control, or any combination thereof.

In such embodiments and others, the ADAS 106 can be configured to change a transfer function used by the ECUs (e.g., body control module 108, powertrain control module 110, and power steering control unit 112) to control driving of the vehicle 102 based on the deviation. And, the transfer function can include or be derived from at least one transfer function for controlling at least one of a steering mechanism of the vehicle 102, a throttle mechanism of the vehicle, or a braking mechanism of the vehicle, or any combination thereof.

Also, the plurality of UI (e.g., UI elements 114*a* to 114*b* of the example car controls 115) can include a transmission control (e.g., manual gearbox and driver-operated clutch or a GUI or another type of UI equivalent such as a voice input UI for changing gears of the vehicle). And, the degrees of control exerted by the driver can include detected user interactions with the transmission control. The transfer function can include or be derived from a transfer function for controlling a transmission mechanism of the vehicle 102.

In such embodiments and others, the vehicle 102 can include a plurality of car controls (e.g., see example car controls 115) configured to be manipulated by a driver to indicate degrees of control exerted by the driver. As shown, the car controls 115 can include the plurality of UI elements (e.g., see UI elements 114*a* to 114*b*). The vehicle 102 can also include a plurality of sensors configured to detect degrees of control exerted by the driver on the plurality of car controls (e.g., the UI elements can measure the detected signals). The plurality of sensors can also be configured to transmit signals indicative of the detected degrees of control electronically to the plurality of ECUs (and/or the UIs can transmit the measured signals electronically to the plurality of ECUs in some embodiments). In such example embodiments, the ECUs can be configured to generate control signals for driving the vehicle based on the signals received from the plurality of sensors and/or received from the plurality of UI elements depending on the embodiment.

In such embodiments and others, the ADAS 106 can be configured to receive the transmitted signals indicative of the detected degrees of control exerted by the driver on the plurality of car controls (e.g., example car controls 115). The ADAS 106 can also be configured to generate a filter for the driver based on a deviation in the transmitted signals and a predetermined model (e.g., a regular-driver model, a safe-driver model, etc.). For example, with the generation of the filter, the ADAS 106 can be configured to identify a pattern of the driver interacting with the UI elements and determine a deviation of the pattern from the predetermined model. Also, the ADAS 106 can be configured to change a transfer function used by the ECUs (e.g., body control module 108, powertrain control module 110, and power steering control unit 112) to control driving of the vehicle 102 based on the generated filter.

In such embodiments and others, to train the generation of the filter, the ADAS 106 can be configured to determine a difference between the changed transfer function and a predetermined transfer function (e.g., the predetermined transfer function may be in the predetermined model). The ADAS 106 can also be configured to adjust the generation of the filter based on the difference between the changed transfer function and the predetermined transfer function. For the generation of the filter, the ADAS 106 can be configured to input the transmitted signals indicative of the detected degrees of control exerted by the driver on the plurality of car controls (e.g., example car controls 115) into an ANN. And, the ADAS 106 can be configured to determine at least one feature of the filter based on output of the ANN.

In such embodiments and others, to train the generation of the filter, the ADAS 106 can be configured to train the ANN. And, to train the ANN, the ADAS 106 can be configured to determine a difference between the changed transfer function and the predetermined transfer function and adjust the ANN based on the difference between the changed transfer function and the predetermined transfer function. Also, the predetermined model can be derived from related models of preselected safe drivers. Also, the predetermined model can be derived from related models for drivers having a preselected driver competence level. The predetermined model can also be derived from related models for drivers having a preselected driving habit. The predetermined model can also be derived from related models for drivers having a preselected driving style. And, the predetermined model can also be derived from any combination thereof.

In such embodiments and others, the plurality of car controls (and/or UI elements—such as GUI elements) can include a steering control (e.g., a steering wheel or a GUI or another type of UI equivalent such as a voice input UI for steering). The plurality of car controls can also include a braking control (e.g., a brake pedal or a GUI or another type of UI equivalent such as a voice input UI for braking). The plurality of car controls can also include a throttling control (e.g., a gas pedal or a GUI or another type of UI equivalent such as a voice input UI for accelerating the vehicle). And, the detected degrees of control exerted by the driver on the plurality of car controls can include detected user interactions with at least one of the steering control, the braking control, or the throttling control, or any combination thereof. In such examples and others, the ADAS 106 can be configured to change a transfer function used by the ECUs to control driving of the vehicle based on the filter. And, the transfer function can include or be derived from at least one transfer function for controlling at least one of a steering mechanism of the vehicle, a throttling mechanism of the vehicle, or a braking mechanism of the vehicle, or any combination thereof.

Also, the plurality of car controls can include a transmission control (e.g., manual gearbox and driver-operated clutch or a GUI or another type of UI equivalent such as a voice input UI for changing gears of the vehicle). And, the detected degrees of control exerted by the driver can include detected user interactions with the transmission control. The transfer function can include or be derived from a transfer function for controlling a transmission mechanism of the vehicle.

In some embodiments, the electronic circuitry of a vehicle (e.g., see vehicles 102 and 202), which can include or be a part of the computing system of the vehicle, can include at least one of engine electronics, transmission electronics, chassis electronics, passenger environment and comfort electronics, in-vehicle entertainment electronics, in-vehicle safety electronics, or navigation system electronics, or any combination thereof (e.g., see body control modules 108 and 220, powertrain control modules 110 and 222, power steering control units 112 and 224, battery management system 226, and infotainment electronics 228 shown in FIGS. 1 and 2 respectively). In some embodiments, the electronic circuitry of the vehicle can include electronics for an automated driving system.

Aspects for driving the vehicle 102 or 202 that can be adjusted can include driving configurations and preferences adjustable from a controller via automotive electronics (such as adjustments in the transmission, engine, chassis, passenger environment, and safety features via respective automotive electronics). The driving aspects can also include typical driving aspects and/or drive-by-wire aspects, such as giving control to steering, braking, and acceleration of the vehicle (e.g., see the body control module 108, the powertrain control module 110, and the power steering control unit 112). Aspects for driving a vehicle can also include controlling settings for different levels of automation according to the SAE, such as control to set no automation preferences/configurations (level 0), driver assistance preferences/configurations (level 1), partial automation preferences/configurations (level 2), conditional automation preferences/configurations (level 3), high automation preferences/configurations (level 4), or full preferences/configurations (level 5). Aspects for driving a vehicle can also include controlling settings for driving mode such as sports or performance mode, fuel economy mode, tow mode, all-electric mode, hybrid mode, AWD mode, FWD mode, RWD mode, and 4WD mode.

In some embodiments, the computing system of the vehicle (such as computing system 104 or 204) can include a central control module (CCM), central timing module (CTM), and/or general electronic module (GEM). Also, in some embodiments, the vehicle can include an ECU, which can be any embedded system in automotive electronics that controls one or more of the electrical systems or subsystems in the vehicle. Types of ECU can include engine control module (ECM), powertrain control module (PCM), transmission control module (TCM), brake control module (BCM or EBCM), CCM, CTM, GEM, body control module (BCM), suspension control module (SCM), or the like. Door control unit (DCU). Types of ECU can also include power steering control unit (PSCU), one or more human-machine interface (HMI) units, powertrain control module (PCM)—which can function as at least the ECM and TCM, seat control unit, speed control unit, telematic control unit, transmission control unit, brake control module, and battery management system.

As shown in FIG. 2, the networked system 100 can include at least a vehicle 202 that includes at least a vehicle computing system 204, a body (not depicted) having an interior (not depicted), a powertrain (not depicted), a climate control system (not depicted), and an infotainment system (not depicted). The vehicle 202 can include other vehicle parts as well.

The computing system 204, which can have similar structure and/or functionality as the computing system 104, can be connected to communications network(s) 120 that can include at least a local to device network such as Bluetooth or the like, a wide area network (WAN), a local area network (LAN), an intranet, a mobile wireless network such as 4G or 5G, an extranet, the Internet, and/or any combination thereof. The computing system 204 can be a machine capable of executing a set of instructions (sequential or otherwise) that specify actions to be taken by that machine. Also, while a single machine is illustrated for the computing system 204, the term "machine" shall also be taken to include any collection of machines that individually or jointly execute a set (or multiple sets) of instructions to perform a methodology or operation. And, it can include at least a bus (e.g., see bus 206) and/or motherboard, one or more controllers (such as one or more CPUs, e.g., see controller 208), a main memory (e.g., see memory 210) that can include temporary data storage, at least one type of network interface (e.g., see network interface 212), a storage system (e.g., see data storage system 214) that can include permanent data storage, and/or any combination thereof. In some multi-device embodiments, one device can complete some parts of the methods described herein, then send the result of completion over a network to another device such that another device can continue with other steps of the methods described herein.

FIG. 2 also illustrates example parts of the computing system 204 that can include and implement the advance driver assist system 106 (or ADAS 106). The computing system 204 can be communicatively coupled to the network(s) 120 as shown. The computing system 204 includes at least a bus 206, a controller 208 (such as a CPU) that can execute instructions of the ADAS 106, memory 210 that can hold the instructions of the ADAS 106 for execution, a network interface 212, a data storage system 214 that can store instructions for the ADAS 106, and other components 216—which can be any type of components found in mobile or computing devices such as GPS components, I/O components such as a camera and various types of user interface components (which can include one or more of the plurality of UI elements described herein) and sensors (which can include one or more of the plurality of sensors described herein). The other components 216 can include one or more user interfaces (e.g., GUIs, auditory user interfaces, tactile user interfaces, car controls, etc.), displays, different types of sensors, tactile, audio and/or visual input/output devices, additional application-specific memory, one or more additional controllers (e.g., GPU), or any combination thereof. The computing system 204 can also include sensor interfaces that are configured to interface sensors of the vehicle 202 which can be one or more of any of the sensors described herein (e.g., see sensors 219a, 219b, and 219c). The bus 206 communicatively couples the controller 208, the memory 210, the network interface 212, the data storage system 214, the other components 216, and the sensors as well as sensor interfaces in some embodiments. The computing system 204 includes a computer system that includes at least controller 208, memory 210 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 214, which communicate with each other via bus 206 (which can include multiple buses).

In some embodiments, the computing system 204 can include a set of instructions, for causing a machine to perform any one or more of the methodologies discussed herein, when executed. In such embodiments, the machine can be connected (e.g., networked via network interface 212) to other machines in a LAN, an intranet, an extranet, and/or the Internet (e.g., network(s) 120). The machine can operate in the capacity of a server or a client machine in client-server network environment, as a peer machine in a peer-to-peer (or distributed) network environment, or as a server or a client machine in a cloud computing infrastructure or environment.

Controller 208 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 208 can also be one or more special-purpose processing devices such as an ASIC, a programmable logic such as an FPGA, a digital signal processor (DSP), network processor, or the like. Controller 208 is configured to execute instructions for performing the operations and steps discussed herein. Controller 208 can further include a network interface device such as network interface 212 to communicate over one or more communications network (such as network(s) 120).

The data storage system 214 can include a machine-readable storage medium (also known as a computer-readable medium) on which is stored one or more sets of instructions or software embodying any one or more of the methodologies or functions described herein. The data storage system 214 can have execution capabilities such as it can at least partly execute instructions residing in the data storage system. The instructions can also reside, completely or at least partially, within the memory 210 and/or within the controller 208 during execution thereof by the computer system, the memory 210 and the controller 208 also constituting machine-readable storage media. The memory 210 can be or include main memory of the system 204. The memory 210 can have execution capabilities such as it can at least partly execute instructions residing in the memory.

The vehicle 202 can also have vehicle body control module 220 of the body, powertrain control module 222 of the powertrain, a power steering control unit 224, a battery management system 226, infotainment electronics 228 of the infotainment system, and a CAN bus 218 that connects at least the vehicle computing system 204, the vehicle body control module, the powertrain control module, the power steering control unit, the battery management system, and the infotainment electronics. Also, as shown, the vehicle 202 is connected to the network(s) 120 via the vehicle computing system 204. Also, shown, vehicle 130 and mobile devices 140 and 150 are connected to the network(s) 120. And, thus, are communicatively coupled to the vehicle 202.

The vehicle 202 is also shown having the plurality of sensors (e.g., see sensors 219a, 219b, and 219c), which can be part of the computing system 204. In some embodiments, the CAN bus 218 can connect the plurality of sensors, the vehicle computing system 204, the vehicle body control module, the powertrain control module, the power steering control unit, the battery management system, and the infotainment electronics to at least the computing system 204. The plurality of sensors can be connected to the computing system 204 via sensor interfaces of the computing system.

As shown in FIG. 3, the networked system 100 can include at least a mobile device 302. The mobile device 302, which can have somewhat similar structure and/or functionality as the computing system 104 or 204, can be connected to communications network(s) 120. And, thus, be connected to vehicles 102, 202, and 130 as well as mobile devices 140 and 150. The mobile device 302 (or mobile device 140 or 150) can include one or more of the plurality of sensors mentioned herein and/or one or more of the plurality of UI elements mentioned herein. Thus, the mobile device 302 (or mobile device 140 or 150) can act as one or more car controls in some embodiments, as shown by example car control 315 which includes the mobile device 302.

The mobile device 302, depending on the embodiment, can be or include a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the mobile device 302 can be connected to communications network(s) 120 that includes at least a local to device network such as Bluetooth or the like, a wide area network (WAN), a local area network (LAN), an intranet, a mobile wireless network such as 4G or 5G, an extranet, the Internet, and/or any combination thereof.

Each of the mobile devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. The computing systems of the vehicles described herein can be a machine capable of executing a set of instructions (sequential or otherwise) that specify actions to be taken by that machine.

Also, while a single machine is illustrated for the computing systems and mobile devices described herein, the term "machine" shall also be taken to include any collection of machines that individually or jointly execute a set (or multiple sets) of instructions to perform any one or more of the methodologies or operations discussed herein. And, each of the illustrated mobile devices can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

FIG. 3 also illustrates example parts of the mobile device 302, in accordance with some embodiments of the present disclosure. The mobile device 302 can be communicatively coupled to the network(s) 120 as shown. The mobile device 302 includes at least a bus 306, a controller 308 (such as a CPU), memory 310, a network interface 312, a data storage system 314, and other components 316 (which can be any type of components found in mobile or computing devices such as GPS components, I/O components such various types of user interface components, and sensors (such as biometric sensors) as well as a camera). The other components 316 can include one or more user interfaces (e.g., GUIs, auditory user interfaces, tactile user interfaces, etc.), displays, different types of sensors, tactile (such as biometric sensors), audio and/or visual input/output devices, additional application-specific memory, one or more additional controllers (e.g., GPU), or any combination thereof. The bus 306 communicatively couples the controller 308, the memory 310, the network interface 312, the data storage system 314 and the other components 316. The mobile device 302 includes a computer system that includes at least controller 308, memory 310 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 314, which communicate with each other via bus 306 (which can include multiple buses).

To put it another way, FIG. 3 is a block diagram of mobile device 302 that has a computer system in which embodiments of the present disclosure can operate. In some embodiments, the computer system can include a set of instructions, for causing a machine to perform some of the methodologies discussed herein, when executed. In such embodiments, the machine can be connected (e.g., networked via network interface 312) to other machines in a LAN, an intranet, an extranet, and/or the Internet (e.g., network(s) 120). The machine can operate in the capacity of a server or a client machine in client-server network environment, as a peer machine in a peer-to-peer (or distributed) network environment, or as a server or a client machine in a cloud computing infrastructure or environment.

Controller 308 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 308 can also be one or more special-purpose processing devices such as an ASIC, a programmable logic such as an FPGA, a digital signal processor (DSP), network processor, or the like. Controller 308 is configured to execute instructions for performing the operations and steps discussed herein. Controller 308 can further include a network interface device such as network interface 312 to communicate over one or more communications network (such as network(s) 120).

The data storage system 314 can include a machine-readable storage medium (also known as a computer-readable medium) on which is stored one or more sets of instructions or software embodying any one or more of the methodologies or functions described herein. The data storage system 314 can have execution capabilities such as it can at least partly execute instructions residing in the data storage system. The instructions can also reside, completely or at least partially, within the memory 310 and/or within the controller 308 during execution thereof by the computer system, the memory 310 and the controller 308 also constituting machine-readable storage media. The memory 310 can be or include main memory of the device 302. The memory 310 can have execution capabilities such as it can at least partly execute instructions residing in the memory.

While the memory, controller, and data storage parts are shown in example embodiments to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As shown in FIG. 3, the mobile device 302 can include a user interface (e.g., see other components 316). The user interface can be configured to provide a graphical user interface (GUI), a tactile user interface, or an auditory user interface, or any combination thereof. For example, the user interface can be or include a display connected to at least one of a wearable structure, a computing device, a camera or any combination thereof that can also be a part of the mobile device 302, and the display can be configured to provide a GUI. Also, embodiments described herein can include one or more user interfaces of any type, including tactile UI (touch), visual UI (sight), auditory UI (sound), olfactory UI (smell), equilibria UI (balance), and gustatory UI (taste).

Also, as shown in FIG. 3, the mobile device 302 can include a computing system (e.g., see the bus 306, controller 308, the memory 310, the network interface 312, and the data storage system 314, which are all components of the computing system). The computing system of the mobile device 302 can be configured to retrieve biometric and/or non-biometric data from its user, itself, and its sensors (e.g., see other components 316), and then send the biometric and/or non-biometric data to a vehicle connected to the mobile device via its network interface and network(s) 120.

FIG. 4 illustrates a flow diagram of example operations of method 400 that can be performed by aspects of the networked system depicted in FIGS. 1 to 3, in accordance with some embodiments of the present disclosure. For example, the method 400 can be performed by a computing system and/or other parts of any vehicle and/or mobile device depicted in FIGS. 1 to 3.

In FIG. 4, the method 400 begins at step 402 with detecting, by a plurality of sensors in a vehicle, signals indicative of degrees of control exerted by a driver with a plurality of UI elements in the vehicle. At step 404, the method 400 continues with measuring, by the plurality UI elements, the signals indicative of degrees of control exerted by the driver. At step 406, the method 400 continues with transmitting, by the plurality UI elements, the measured signals electronically to a plurality of electronic control units (ECUs) of the vehicle and an advanced driver assistance system of the vehicle. At step 408, the method 400 continues with generating, by the ECUs, control signals for driving the vehicle based on the measured signals received from the plurality of UI elements. At step 410, the method 400 continues with identifying, by the advanced driver assistance system, a pattern of the driver interacting with the plurality of UI elements based on the measured signals received from the plurality of UI elements. At step 412, the method 400 continues with determining, by the advanced driver assistance system, a deviation of the pattern from a predetermined model. At step 414, the method 400 continues with adjusting, by the advanced driver assistance system, the plurality of ECUs in converting the signals measured by the UI elements to the control signals for driving the vehicle according to the deviation.

FIG. 5 illustrates a flow diagram of example operations of method 500 that can be performed by aspects of the networked system depicted in FIGS. 1 to 3, in accordance with some embodiments of the present disclosure. For example, the method 500 can be performed by a computing system and/or other parts of any vehicle and/or mobile device depicted in FIGS. 1 to 3. As shown, the method 500 begins with steps 402 to 412 of method 400. Then, at step 502, the method 500 continues with generating, by the advanced driver assistance system, a signal modulation for the driver based on the determined deviation. At step 504, the method 500 continues with adjusting, by the advanced driver assistance system, the plurality of ECUs in converting the signals measured by the UI elements to the control signals for driving the vehicle according to the generated signal modulation.

FIG. 6 illustrates a flow diagram of example operations of method 600 that can be performed by aspects of the networked system depicted in FIGS. 1 to 3, in accordance with some embodiments of the present disclosure. For example, the method 600 can be performed by a computing system and/or other parts of any vehicle and/or mobile device depicted in FIGS. 1 to 3. As shown, the method 600 begins with steps 402 to 412 of method 400. Then, at step 602, the method 600 continues with changing, by the advanced driver assistance system, a transfer function of the plurality of UI elements based on the determined deviation. At step 604, the method 600 continues with adjusting, by the advanced driver assistance system, the plurality of ECUs in converting the signals measured by the UI elements to the control signals for driving the vehicle according to the changed transfer function.

In some embodiments, it is to be understood that the steps of methods 400, 500, or 600 can be implemented as a continuous process such as each step can run independently by monitoring input data, performing operations and outputting data to the subsequent step. Also, such steps for each method can be implemented as discrete-event processes such as each step can be triggered on the events it is supposed to trigger and produce a certain output. It is to be also understood that each figure of FIGS. 4 to 6 represents a minimal method within a possibly larger method of a computer system more complex than the ones presented partly in FIGS. 1 to 3. Thus, the steps depicted in each figure of FIGS. 4 to 6 can be combined with other steps feeding in from and out to other steps associated with a larger method of a more complex system.

It is to be understood that a vehicle described herein can be any type of vehicle unless the vehicle is specified otherwise. Vehicles can include cars, trucks, boats, and airplanes, as well as vehicles or vehicular equipment for military, construction, farming, or recreational use. Electronics used by vehicles, vehicle parts, or drivers or passengers of a vehicle can be considered vehicle electronics. Vehicle electronics can include electronics for engine management, ignition, radio, carputers, telematics, in-car entertainment systems, and other parts of a vehicle. Vehicle electronics can be used with or by ignition and engine and transmission control, which can be found in vehicles with internal combustion powered machinery such as gas-powered cars, trucks, motorcycles, boats, planes, military vehicles, forklifts, tractors and excavators. Also, vehicle electronics can be used by or with related elements for control of electrical systems found in hybrid and electric vehicles such as hybrid or electric automobiles. For example, electric vehicles can use power electronics for the main propulsion motor control, as well as managing the battery system. And, autonomous vehicles almost entirely rely on vehicle electronics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
   a plurality of electronic control units (ECUs) configured to control driving of a vehicle;
   a plurality of user interface (UI) elements configured to be manipulated by a driver of the vehicle to indicate degrees of control exerted that are based at least in part on interactions of the driver with at least one of a steering control, a braking control, or a throttling control, or any combination thereof, the plurality of UI elements configured to:
      measure signals indicative of the degrees of control exerted by the driver while the vehicle is being driven; and
      transmit the signals to an ECU of the plurality of ECUs, wherein the ECUs are configured to generate control signals for driving the vehicle based on the signals received from the UI elements and further based on the signals indicative of the degrees of control exerted by the driver; and
   an advanced driver assistance system (ADAS) including an artificial neural network (ANN) trained with input characteristics of the driver, output characteristics of a safe driver and an algorithm to determine and transform the input characteristics of the driver to the output characteristics of the safe driver,
      wherein the ADAS is configured to modulate an input of the driver to match an input of a safe driver for generating a control signal for driving the vehicle, and wherein the input of the safe driver is determined by the ANN.

2. The apparatus of claim 1, wherein the ADAS is further configured to adjust the plurality of ECUs in converting the signals measured by the UI elements to the control signals for driving the vehicle according to sensor data indicative of environmental conditions of the vehicle.

3. The apparatus of claim 2, wherein the ADAS is further configured to:
   determine response differences between the signals generated by the plurality of UI elements and driving decisions generated autonomously by the ADAS according to the predetermined model and the sensor data indicative of environmental conditions of the vehicle; and
   train an artificial neural network (ANN) to compare the pattern based on the response differences.

4. The apparatus of claim 1, wherein the ADAS is configured to:
   receive the signals;
   input the signals indicative of the degrees of control into an artificial neural network (ANN); and
   determine at least one feature of the comparison based on output of the ANN.

5. The apparatus of claim 4, wherein the ADAS is configured to train the ANN and adjust the ANN based on the comparison.

6. The apparatus of claim 1, wherein the predetermined model is derived from related models of preselected safe drivers, related models for drivers having a preselected driver competence level, related models for drivers having a preselected driving habit, or related models for drivers having a preselected driving style, or any combination thereof.

7. The apparatus of claim 1, wherein the plurality of UI elements comprises a steering control, a braking control, and a throttling control.

8. The apparatus of claim 7, wherein the ADAS is configured to change a transfer function used by the ECUs to control driving of the vehicle based on the comparison, and wherein the transfer function comprises or is derived from at least one transfer function for controlling at least one of a steering mechanism of the vehicle, a throttle mechanism of the vehicle, or a braking mechanism of the vehicle, or any combination thereof.

9. The apparatus of claim 8, wherein the plurality of UI elements comprises a transmission control, and wherein the degrees of control exerted by the driver comprise detected user interactions with the transmission control.

10. The apparatus of claim 9, wherein the transfer function comprises or is derived from a transfer function for controlling a transmission mechanism of the vehicle.

11. An apparatus, comprising:
    a plurality of electronic control units (ECUs) configured to control driving of a vehicle;
    a plurality of car controls configured to be manipulated by a driver of the vehicle to indicate degrees of control exerted that are based at least in part on interactions of the driver with at least one of a steering control, a braking control, or a throttling control, or any combination thereof;
    a plurality of sensors configured to:
       detect degrees of control exerted by the driver on the plurality of car controls while the vehicle is being driven; and
       transmit signals indicative of the detected degrees of control to an ECU of the plurality of ECUs, wherein the ECUs are configured to generate control signals for driving the vehicle based on the signals received from the plurality of sensors and further based on the signals indicative of the degrees of control exerted by the driver; and
    an advanced driver assistance system (ADAS) including an artificial neural network (ANN) trained with input characteristics of the driver, output characteristics of a safe driver and an algorithm to determine and transform the input characteristics of the driver to the output characteristics of the safe driver,
  wherein the ADAS is configured to modulate an input of the driver to match an input of a safe driver for generating a control signal for driving the vehicle, and wherein the input of the safe driver is determined by the ANN.

12. The apparatus of claim 11, wherein the ADAS is configured to:
  compare the changed transfer function to a predetermined transfer function; and
  adjust the generation of the filter based on the comparison of the changed transfer function to the predetermined transfer function.

13. The apparatus of claim 12, wherein the ADAS is configured to:
  input the signals indicative of the detected degrees of control exerted by the driver on the plurality of car controls into an artificial neural network (ANN); and
  determine at least one feature of the filter based on output of the ANN.

14. The apparatus of claim 13, wherein the ADAS is configured to train the ANN and
  adjust the ANN based on the comparison of the changed transfer function to the predetermined transfer function.

15. The apparatus of claim 12, wherein the predetermined transfer function is derived from related transfer functions of preselected safe drivers, related transfer functions for drivers having a preselected driver competence level, related transfer functions for drivers having a preselected driving habit, or related transfer functions for drivers having a preselected driving style, or any combination thereof.

16. The apparatus of claim 11, wherein the plurality of car controls comprises a steering control, a braking control, and a throttling control.

17. The apparatus of claim 16, wherein the ADAS is configured to change the transfer function used by the ECUs to control driving of the vehicle based on the filter, and wherein the transfer function comprises or is derived from at least one transfer function for controlling at least one of a steering mechanism of the vehicle, a throttling mechanism of the vehicle, or a braking mechanism of the vehicle, or any combination thereof.

18. A method, comprising:
  detecting, by a plurality of sensors in a vehicle, signals indicative of degrees of control exerted by a driver with a plurality of user interface (UI) elements in the vehicle;
  measuring, by the plurality UI elements, the signals indicative of degrees of control exerted by the driver while the vehicle is being driven;
  transmitting, by the plurality UI elements, the signals to a plurality of electronic control units (ECUs) of the vehicle and an advanced driver assistance system (ADAS) of the vehicle;
  generating, by the ECUs, control signals for driving the vehicle based on the signals received from the plurality of UI elements and further based on the signals indicative of the degrees of control exerted by the driver;
  training an artificial neural network (ANN) of the ADAS with input characteristics of the driver, output characteristics of a safe driver and an algorithm to determine and transform the input characteristics of the driver to the output characteristics of the safe driver; and
  modulating an input of the driver to match an input of a safe driver for generating a control signal for driving the vehicle, the input of the safe driver being determined by the ANN.

19. The method of claim 18, comprising:
  generating, by the ADAS, a signal modulation for the driver based on the comparison; and
  adjusting, by the ADAS, the plurality of ECUs in converting the signals measured by the UI elements to the control signals for driving the vehicle according to the generated signal modulation.

20. The method of claim 18, comprising:
  changing, by the ADAS, a transfer function of the plurality of UI elements based on the comparison; and
  adjusting, by the ADAS, the plurality of ECUs in converting the signals measured by the UI elements to the control signals for driving the vehicle according to the changed transfer function.

* * * * *